US010632658B2

(12) United States Patent
Imai (10) Patent No.: US 10,632,658 B2
(45) Date of Patent: Apr. 28, 2020

(54) INJECTION MOLDING SYSTEM

(71) Applicant: FANUC CORPORATION, Yamanashi (JP)

(72) Inventor: Yuusuke Imai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 285 days.

(21) Appl. No.: 15/471,576

(22) Filed: Mar. 28, 2017

(65) Prior Publication Data
US 2017/0282428 A1  Oct. 5, 2017

(30) Foreign Application Priority Data

Apr. 4, 2016  (JP) .................................. 2016-075329

(51) Int. Cl.
*B29C 45/76* (2006.01)
(52) U.S. Cl.
CPC .... *B29C 45/768* (2013.01); *B29C 2945/7629* (2013.01); *B29C 2945/76464* (2013.01);
(Continued)
(58) Field of Classification Search
CPC ........ B29C 45/768; B29C 2945/76464; B29C 2945/76939; B29C 2945/76993; B29C 2945/7629
See application file for complete search history.

(56) References Cited

U.S. PATENT DOCUMENTS

| 4,841,364 A | * | 6/1989 | Kosaka | ................ B29C 45/7626 |
| | | | | 348/128 |
| 2003/0211188 A1 | * | 11/2003 | Kachnic | .................. B29C 45/76 |
| | | | | 425/137 |

(Continued)

FOREIGN PATENT DOCUMENTS

| CN | 1446680 A | 10/2003 |
| CN | 104786456 A | 7/2015 |

(Continued)

OTHER PUBLICATIONS

Notice of Allowance in JP Application No. 2016-075329, dated May 1, 2018, 7pp.

*Primary Examiner* — Joseph S Del Sole
*Assistant Examiner* — Jerzi H Moreno Hernandez
(74) *Attorney, Agent, or Firm* — Hauptman Ham, LLP (57) ABSTRACT

An injection molding system includes: an injection molding machine; a physical quantity acquisition unit configured to obtain a physical quantity regarding the injection molding; a molded product image acquisition unit configured to obtain an image of a molded product; a molded product image storage unit configured to store an image of a molded product; an image storage condition setting unit configured to set a condition used for determining whether to store an image of a molded product corresponding to the physical quantity obtained by the physical quantity acquisition unit; and an image storage determination unit configured to determine whether to store the image of the molded product corresponding to the physical quantity, according to the physical quantity obtained by the physical quantity acquisition unit and the condition set by the image storage condition setting unit, and store the image in accordance with the determination result.

5 Claims, 7 Drawing Sheets

(52) U.S. Cl.
CPC ............ *B29C 2945/76939* (2013.01); *B29C 2945/76993* (2013.01)

(56) References Cited

U.S. PATENT DOCUMENTS

| | | | | |
|---|---|---|---|---|
| 2009/0167877 | A1* | 7/2009 | Imamura | G03B 7/00 |
| | | | | 348/208.4 |
| 2013/0277885 | A1* | 10/2013 | Nagami | B22D 17/32 |
| | | | | 264/299 |
| 2015/0202815 | A1 | 7/2015 | Murata | |
| 2016/0236392 | A1* | 8/2016 | Aoyama | B22D 17/32 |

FOREIGN PATENT DOCUMENTS

| | | | | |
|---|---|---|---|---|
| JP | H6-210692 | A | | 8/1994 |
| JP | H7-290545 | A | | 11/1995 |
| JP | 2000-253354 | A | | 9/2000 |
| JP | 2000253354 | A | * | 9/2000 |
| JP | 2006175619 | A | * | 7/2006 |
| JP | 2006175619 | A | | 7/2006 |
| JP | 2013086358 | A | * | 5/2013 |
| JP | 2013086358 | A | | 5/2013 |

\* cited by examiner

FIG.2

| STORING | YES | NO | YES |
|---|---|---|---|

| MONITORING OF MINIMUM CUSHION AMOUNT | ON | | | |
|---|---|---|---|---|
| DISTRIBUTION OF DETECTED MINIMUM CUSHION AMOUNT | 3σ OR GREATER -3σ OR LESS | 2σ TO 3σ -2σ TO -3σ | 1σ TO 2σ -1σ TO -2σ | -1σ TO 1σ |
| STORING | YES | YES | NO | NO |

| MONITORING OF PEAK INJECTION PRESSURE | ON | | | |
|---|---|---|---|---|
| DISTRIBUTION OF DETECTED PEAK INJECTION PRESSURE | 3σ OR GREATER -3σ OR LESS | 1.5σ TO 3σ -1.5σ TO -3σ | 0.5σ TO 1.5σ -0.5σ TO -1.5σ | -0.5σ TO 0.5σ |
| STORING | YES | NO | NO | NO |

| MONITORING OF MINIMUM CUSHION AMOUNT | ON | | | | |
|---|---|---|---|---|---|
| DISTRIBUTION OF DETECTED MINIMUM CUSHION AMOUNT | 3σ OR GREATER -3σ OR LESS | 2σ TO 3σ -2σ TO -3σ | 1σ TO 2σ -1σ TO -2σ | -1σ TO 1σ | |
| ADDITIONALLY STORING | 3 | 0 | 0 | 3 | |

| MONITORING OF PEAK INJECTION PRESSURE | ON | | | | |
|---|---|---|---|---|---|
| DISTRIBUTION OF DETECTED PEAK PRESSURE | 3σ OR GREATER -3σ OR LESS | 1.5σ TO 3σ -1.5σ TO -3σ | 0.5σ TO 1.5σ -0.5σ TO -1.5σ | -0.5σ TO 0.5σ | |
| ADDITIONALLY STORING | 3 | 1 | 1 | 3 | |

FIG.5

| MONITORING OF MINIMUM CUSHION AMOUNT | | ON |
|---|---|---|
| MEDIAN VALUE SETTING | | 4.50mm |

| MONITORING RANGE SETTING | STORAGE SETTING |
|---|---|
| +2.00mm | 5 |
| +1.50mm | 5 |
| +1.00mm | 2 |
| MEDIAN VALUE | 0 |
| -1.00mm | 0 |
| -1.50mm | 2 |
| -2.00mm | 5 |

| MONITORING OF PEAK INJECTION PRESSURE | | OFF |
|---|---|---|
| MEDIAN VALUE SETTING | | 120MPa |

| MONITORING RANGE SETTING | STORAGE SETTING |
|---|---|
| +3MPa | 3 |
| +2MPa | 3 |
| +1MPa | 3 |
| MEDIAN VALUE | 3 |
| -1MPa | 3 |
| -2MPa | 3 |
| -3MPa | 3 |

FIG.6

INJECTION MOLDING SYSTEM

RELATED APPLICATION(S)

The present application claims priority to Japanese Patent Application Number 2016-075329 filed on Apr. 4, 2016, the disclosure of which is hereby incorporated by reference herein in its entirety.

BACKGROUND OF THE INVENTION

1. Field of the Invention

The present invention relates to an injection molding system including an injection molding machine for storing physical quantities detected during molding and images of molded products.

2. Description of the Related Art

In the field of injection molding, it is known that an injection molding machine detects physical quantities regarding injection molding in each molding cycle directly or indirectly so as to determine whether molded products attain an acceptable level of quality. Examples of physical properties directly indicating molded products include mass and a size. Examples of physical properties indirectly indicating molded products include a pressure, a position, a velocity, and a temperature, measured by an injection molding machine during molding. Injection molding systems also acquire images of molded products by an image capture unit such as a camera and store the images in storage means.

Japanese Patent Application Laid-Open No. 2006-175619 discloses a system that stores all image data of molded products so as to determine whether the level of quality of molded products is acceptable or not. Japanese Patent Application Laid-Open No. 2013-086358 discloses a system that correlates physical quantities detected by an injection molding machine with results of image analysis of molded products.

The reason for storing image data of a molded product in each molding cycle is that the image data of the molded product itself can be used for traceability of the molded product. In particular, when a problem such as a defect is found with a molded product or a final product including the molded product as a component, physical quantities detected in the process of manufacturing the molded product are analyzed. The actual image data of the molded product allow the system to analyze the cause of the defect more accurately.

Storing image data of molded products together with physical quantities detected during manufacture is necessary for ensuring quality of the products. However, an increase of the number of molding cycles requires an increase of storage capacity of storage means necessary for storing image data of molded products. The increase of storage capacity of the storage means as required leads to an increase in cost.

SUMMARY OF THE INVENTION

Accordingly, the object of the present invention is to provide an injection molding system capable of efficiently storing image data of molded products while avoiding an increase of storage capacity of storage means necessary for data storage.

The present invention solves the conventional problems by selectively storing image data of a molded product in the storage means depending on physical quantities detected during molding in each cycle, so as to avoid an increase of storage capacity of the storage means in the system.

A first aspect of an injection molding system according to the present invention includes: an injection molding machine implementing injection molding; a physical quantity acquisition unit configured to obtain a physical quantity regarding the injection molding; a molded product image acquisition unit configured to obtain an image of a molded product molded by the injection molding; an image storage condition setting unit configured to set a condition used for determining whether to store the image of the molded product obtained by the molded product image acquisition unit, based on the physical quantity obtained by the physical quantity acquisition unit when the molded product is molded; a molded product image storage unit configured to store an image of a molded product; and an image storage determination unit configured to determine whether to store the image of the molded product obtained by the molded product image acquisition unit according to the physical quantity of the molded product obtained by the physical quantity acquisition unit and the condition set by the image storage condition setting unit, and store the image in the molded product image storage unit in accordance with a determination result.

A second aspect of an injection molding system according to the present invention includes: an injection molding machine implementing injection molding; a physical quantity acquisition unit configured to obtain a physical quantity regarding the injection molding; a molded product image acquisition unit configured to obtain an image of a molded product molded by the injection molding; an image storage condition setting unit configured to set a condition used for determining whether to store the image of the molded product obtained by the molded product image acquisition unit, based on the physical quantity obtained by the physical quantity acquisition unit when the molded product is molded; a molded product image storage unit configured to store the image of the molded product obtained by the molded product image acquisition unit; and a molded product image storage determination unit configured to determine whether to store the image of the molded product obtained by the molded product image acquisition unit according to the physical quantity of the molded product obtained by the physical quantity acquisition unit and the condition set by the image storage condition setting unit, and delete the image stored in the molded product image storage unit in accordance with a determination result.

A third aspect of an injection molding system according to the present invention includes: an injection molding machine implementing injection molding; a physical quantity acquisition unit configured to obtain a physical quantity regarding the injection molding; a molded product image acquisition unit configured to obtain an image of a molded product manufactured by the injection molding machine; an image storage condition setting unit configured to set a condition used for determining whether to store the image of the molded product obtained by the molded product image acquisition unit, based on the physical quantity obtained by the physical quantity acquisition unit when the molded product is molded; a buffer configured to store the image of the molded product obtained by the molded product image acquisition unit; a molded product image storage unit configured to store an image of a molded product; and a molded product image storage determination unit configured to determine, according to the physical quantity of the molded product obtained by the physical quantity acquisition unit and the condition set by the image storage condition setting unit, whether to store the image of the molded product corresponding to the physical quantity, obtained by the molded product image acquisition unit, store the image of the molded product stored in the buffer in the molded product image storage unit in accordance with a determination result, and delete from the buffer the image of the molded product that has been stored in the molded product image storage unit and an image of a molded product that has not been stored therein.

The image storage condition setting unit may set the condition based on a difference between the obtained physical quantity and a reference physical quantity preliminarily determined or calculated according to at least one physical quantity obtained in a past molding cycle.

The image storage condition setting unit may set the condition based on a deviation value obtained by calculating statistical values on physical quantities obtained in past molding cycles.

The image storage condition setting unit may set the condition for each of predetermined monitoring ranges of the physical quantity.

The molded product image storage determination unit may set a condition used for determining whether to store, in the molded product image storage unit, additional images of molded products obtained in molding cycles before and after a molding cycle in which the molded product is molded, in addition to the image of the molded product determined to be stored.

The molded product image storage unit may be provided in an operating device connected to the injection molding machine via a network.

According to the present invention, the injection molding system can efficiently store images by determining the necessity of data storage depending on physical quantities regarding molded products, so as to avoid an increase of storage capacity of the storage means for storing image data.

DETAILED DESCRIPTION OF THE PREFERRED EMBODIMENTS

An injection molding system according to the present invention stores quantities of physical properties of molded products obtained in molding cycles, while taking into account the fact that the probability that a molded product is defective is low when the respective physical quantities of the molded product detected during molding are approximate to a center of quality determination allowable values preliminarily determined, and that the probability that the molded product is defective increases when the respective physical quantities of the molded product deviate from the center even when falling within the range of the quality determination allowable values.

When the respective physical quantities of the molded product detected during molding deviates from the central value and further from a predetermined allowable range of stored physical quantities, image data of the molded product are stored. When the detected physical quantities approximate to the central value, the image data are not stored because the probability that the molded product is defective is low and the level of necessity of the data storage is thus low.

Selectively storing image data of molded products in storage means depending on the necessity can save the storage capacity of the storage means. The system can avoid an increase of the storage capacity.

Figure 1:
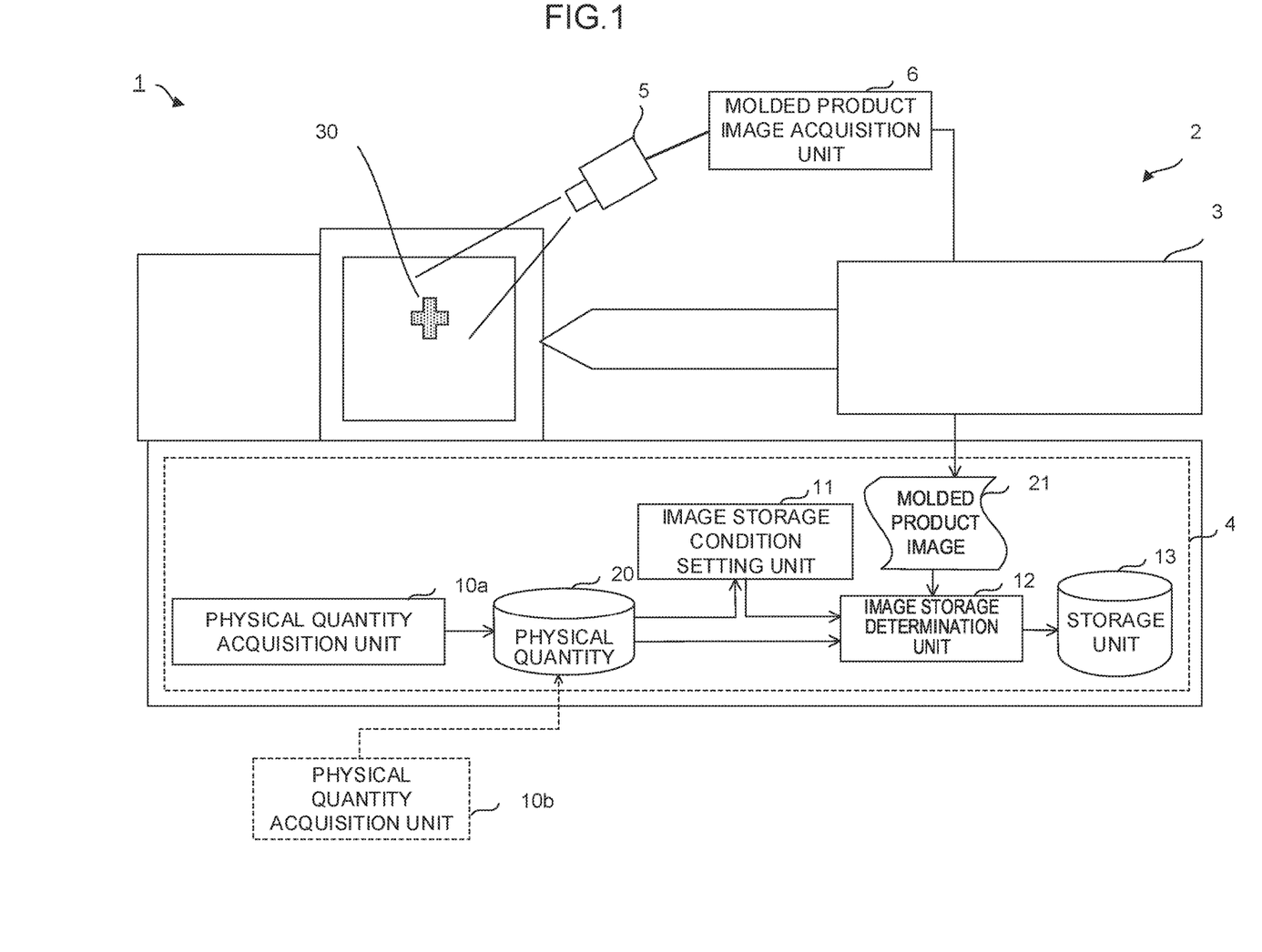
FIG. 1 is a block diagram showing a principal part of an injection molding system according to an embodiment of the present invention.

FIG. 1 a block diagram showing a principal part of an injection molding system according to an embodiment of the present invention.

An injection molding machine 2 included in the injection molding system 1 implements a function to store images of molded products. The injection molding machine 2 includes an injection molding main body 3, a controller 4 for entirely controlling the injection molding main body 3, an imaging device 5 for imaging a molded product 30 molded by the injection molding main body 3, and a molded product image acquisition unit 6 for sending an image of the molded product 30 imaged by the imaging device 5 to the controller 4. The injection molding main body 3 includes various kinds of detectors (not shown in fig.) for detecting various kinds of physical quantities in order to monitor molding conditions, such as a temperature detector for detecting temperature of a metal mold and an injection cylinder, a pressure detector for detecting resin pressure, and a position/velocity detector for detecting a rotational position/velocity of an injection screw and a moving position/velocity of the injection screw in the axial direction.

The controller 4 includes a display device and manual input means through which various kinds of set values are input, and controls the injection molding main body 3 according to the set values and a control program. The controller 4 also includes a physical quantity acquisition unit 10a, an image storage condition setting unit 11, and an image storage determination unit 12.

The physical quantity acquisition unit 10a acquires physical quantities of a molded product detected and output from the various detectors included in the injection molding main body 3, and stores the detected physical quantities as physical quantity data 20 in a storage region existing in memory installed in the controller 4. The controller 4 temporarily saves, to the memory, an image of the molded product received from the molded product image acquisition unit 6 as molded product image data 21. The storage region in the memory stores pieces of physical quantity data 20 of physical quantities obtained in molding cycles each executed at least under the same conditions, while each piece of physical quantity data 20 is correlated with, for example, the cycle number indicating the sequence of the molding cycles.

The image storage condition setting unit 11 sets conditions for determining to store the molded product image data 21 based on the physical quantity data 20 obtained by the physical quantity acquisition unit 10a and stored in the memory.

The image storage determination unit 12 determines whether to store the molded product image data 21 of the molded product imaged during which the physical quantity acquisition unit 10a obtains the physical quantities, according to the conditions set by the image storage condition setting unit 11 and the physical quantities obtained by the physical quantity acquisition unit 10a. When it is determined that the molded product image data 21 should be stored, the image storage determination unit 12 stores, in the molded product image storage unit 13, the molded product image data 21 temporarily saved in the memory, while correlating the molded product image data 21 with the cycle number indicating the sequence of the molding cycles.

The image storage condition setting unit 11 may set the conditions for data storage regarding the molded product in such a way as to calculate a reference physical quantity, such as an average value, a center value, or a mode, for each of the physical quantities based on multiple pieces of physical quantity data 20 obtained in past molding cycles, compare the reference physical quantity with each of the respective physical quantities of the molded product obtained in the current cycle, and lead the image storage determination unit 12 to store the molded product image data 21 of the molded product when the variance between the quantities is greater than a predetermined threshold.

Figure 2:
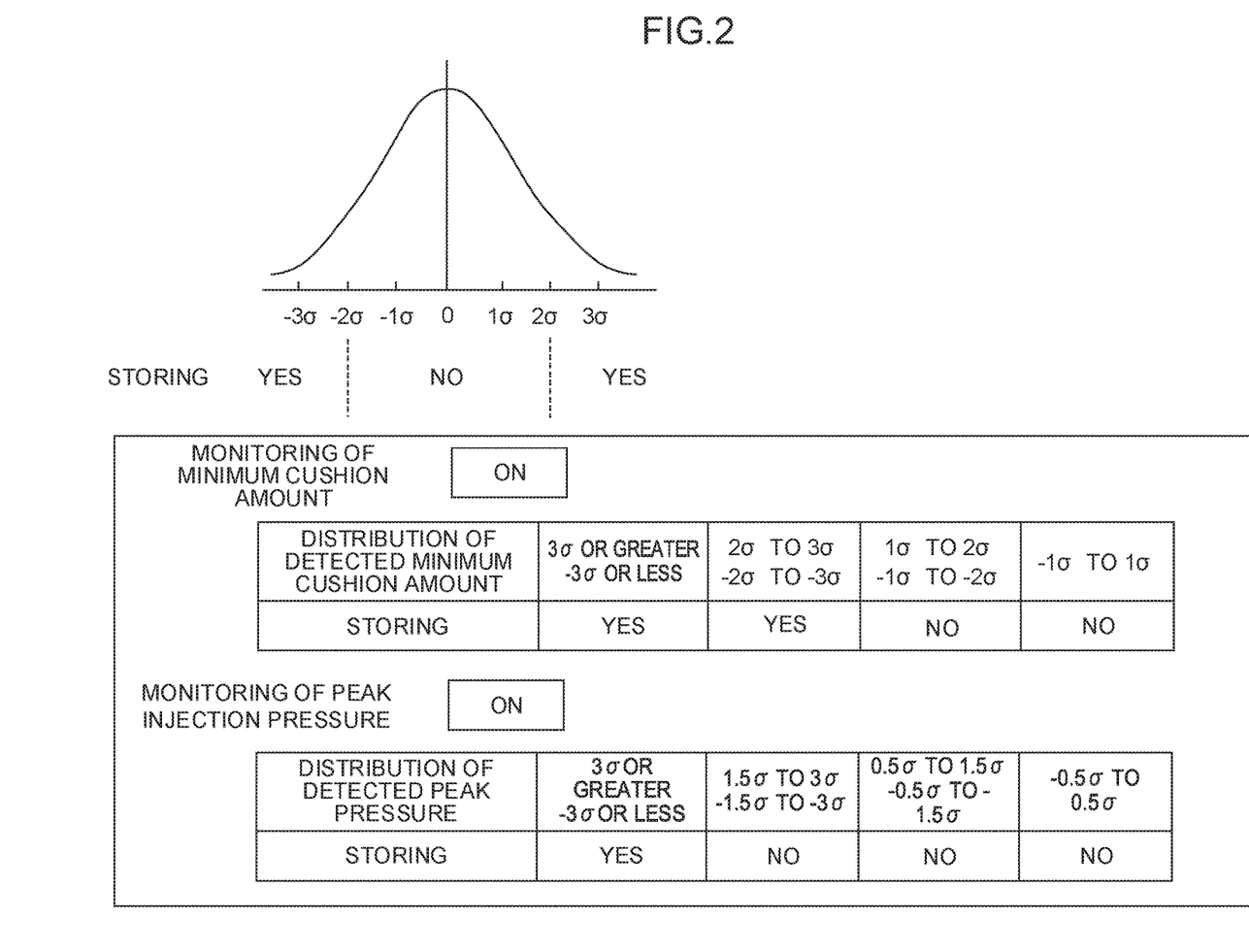
FIG. 2 is a diagram showing conditions for data storage determined depending on deviation values set in an image storage condition setting unit shown in FIG. 1.
Figure 3:
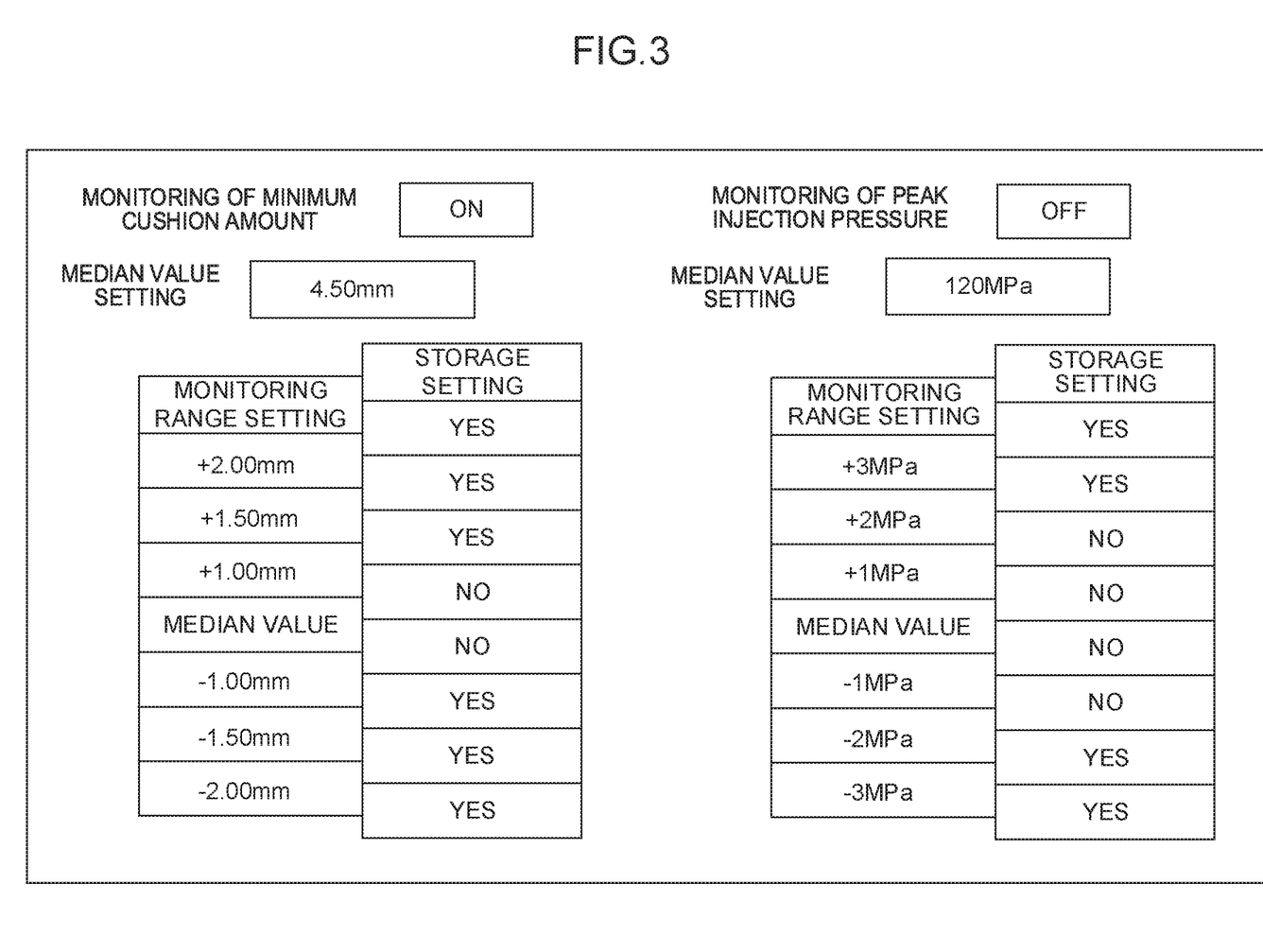
FIG. 3 is a diagram showing conditions for data storage determined depending on monitoring ranges set in the image storage condition setting unit shown in FIG. 1.

Alternatively, the image storage condition setting unit 11 may set the conditions for data storage in such a way as to, as shown in FIG. 2, calculate a deviation value by calculating statistical values on each kind of the physical quantities based on multiple pieces of physical quantity data 20 obtained in past molding cycles, and lead the image storage determination unit 12 to store the molded product image data 21 of the molded product when the deviation value deviates from a predetermined range. The image storage condition setting unit 11 may also set the conditions for data storage in such a way as to, as shown in FIG. 3, preliminarily set a plurality of monitoring ranges regarding the respective physical quantities (such as a monitoring range of physical quantity and a deviation value), and lead the image storage determination unit 12 to determine whether to store the molded product image data 21 in the molded product image storage unit 13 depending on the respective monitoring ranges.

In the case where the molded product image data 21 of the molded product are determined to be stored in the molded product image storage unit 13, the image storage condition setting unit 11 may further set conditions for determining to store additional images obtained in molding cycles before and after the molding cycle of the image determined to be stored. The image storage condition setting unit 11 may:

(1) set the total number of images to be stored (for example, when the total number of images stored is set to five, stores imaged in the preceding two molding cycles and stores imaged in the following two molding cycles are stored, in addition to the image having been determined to be stored); or (2) set the number of images to be additionally stored.

Figure 4:
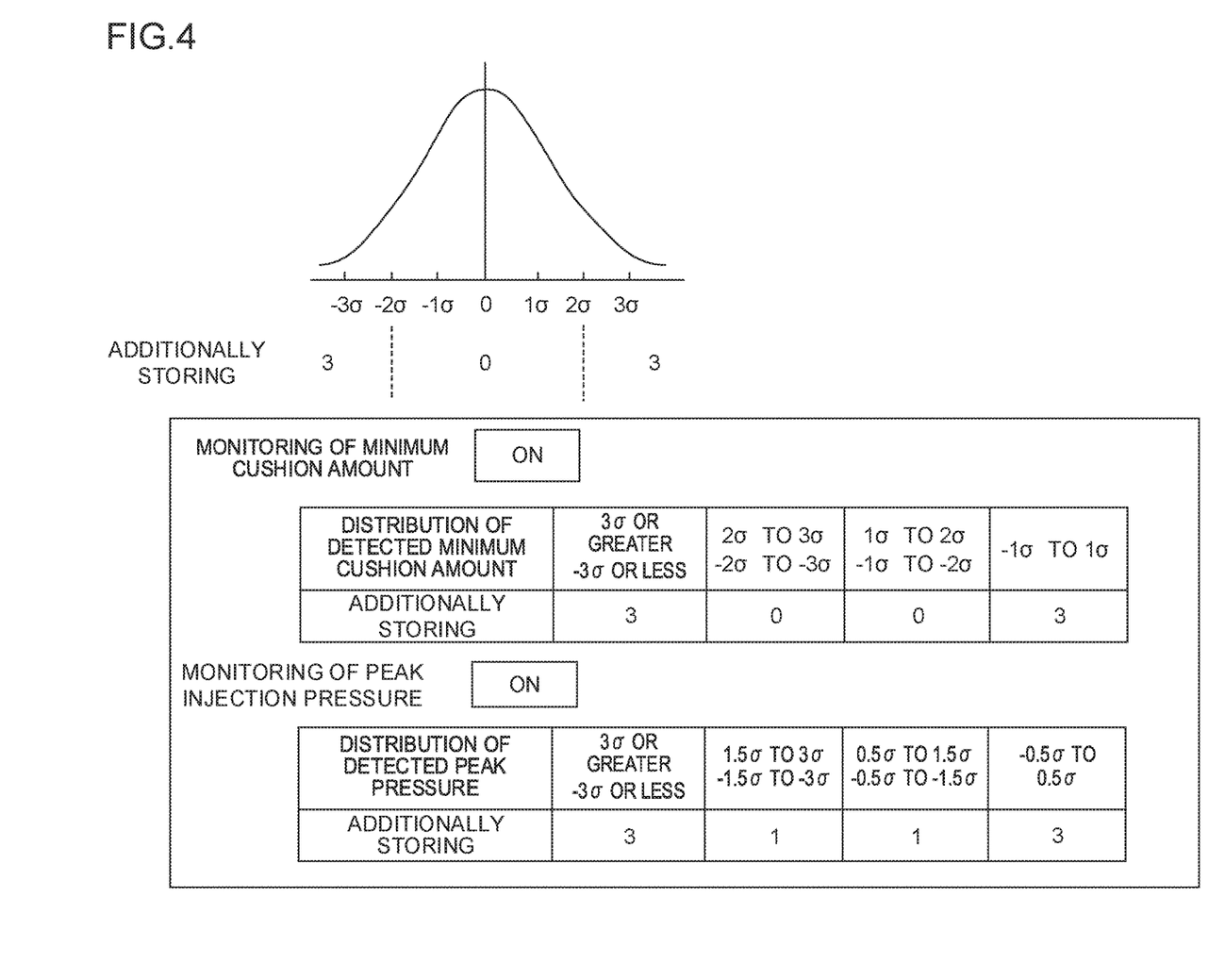
FIG. 4 is a diagram showing the number of stored images inputted to the conditions for data storage shown in FIG. 2.
Figure 5:
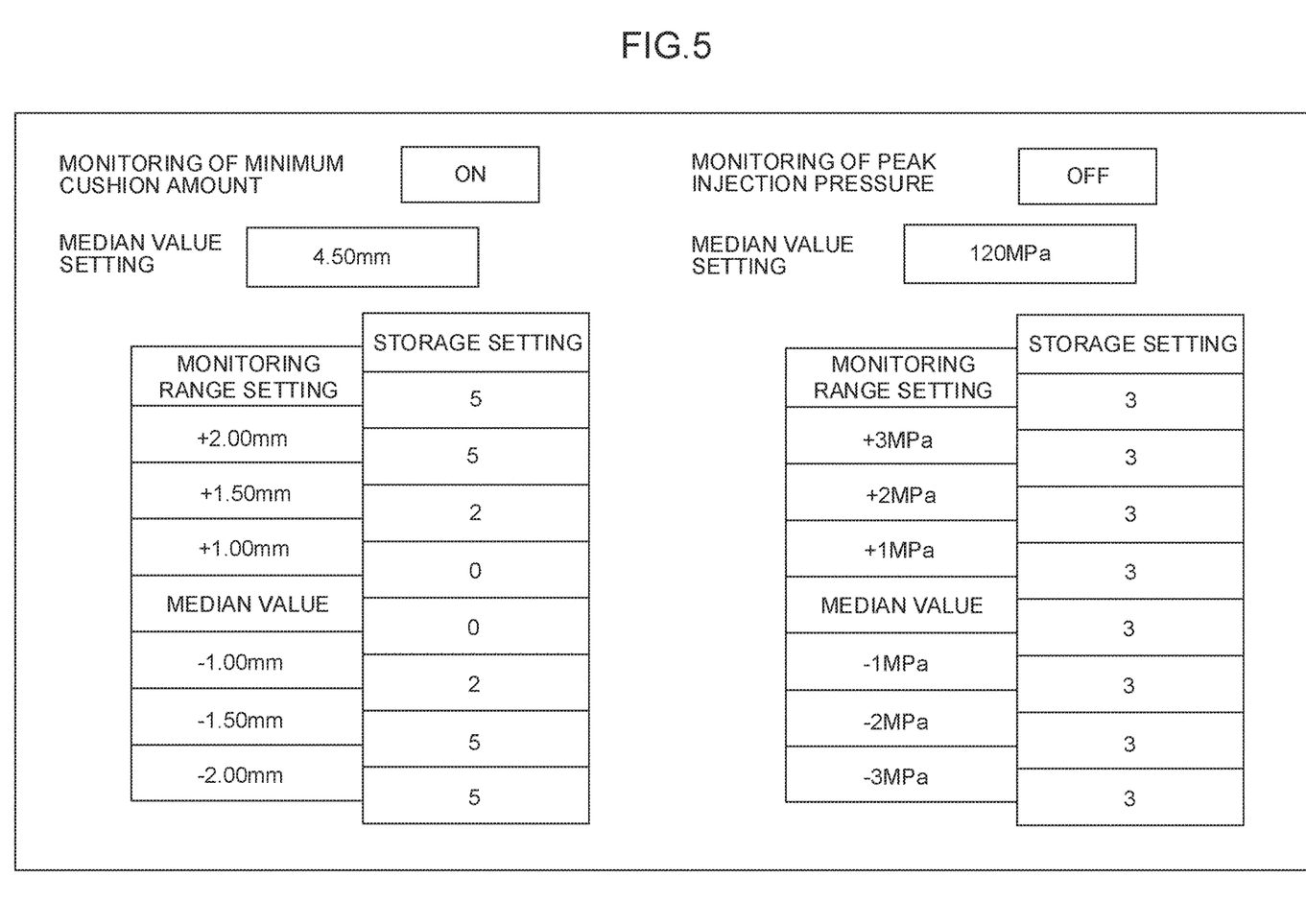
FIG. 5 is a diagram showing the number of stored images inputted to the conditions for data storage shown in FIG. 3.

In the case of (2) above, the image storage condition setting unit 11 may set the total number of images to be additionally stored, or may set an additional storage condition such that images stored in the preceding two molding cycles and images stored in the following two molding cycles are additionally stored in addition to the image determined to be stored according to the physical quantities obtained, when the number of images to be additionally stored is set to two. The image storage condition setting unit 11 may set the number of images to be additionally stored in the preceding cycles differently from the following cycles. The image storage condition setting unit 11 may increase the number of images to be additionally stored as the respective physical quantities increasingly depart from an average value, as shown in FIG. 4, or may preliminarily set a plurality of monitoring ranges of the respective physical quantities and input the number of images to be stored to each of the monitoring ranges, as shown in FIG. 5.

The physical quantity data 20 obtained during molding and used by the image storage condition setting unit 11 and the image storage determination unit 12 may include the quantities of physical properties such as a pressure, a position, a velocity, and a temperature indicating the molding conditions acquired by the physical quantity acquisition unit 10a from the various detectors, as described above. However, these physical quantities indirectly detected are used for monitoring the molding conditions of the molded product and do not necessarily correlate with the quality of the molded product. The injection molding system 1, therefore, may further include a physical quantity acquisition unit 10b that obtains quantities of physical properties such as mass and a size output from a measurement device for directly measuring the molded product and stores the obtained quantities in the memory, so that the image storage condition setting unit 11 and the image storage determination unit 12 appropriately use the physical quantities obtained by the respective physical quantity acquisition units 10a and 10b and stored in the memory.

While the embodiment of the present invention has been described above, it should be understood that the present invention is not intended to be limited to the examples of the embodiment, and the present invention may be modified as appropriate and applicable to various modes.

Figure 6:
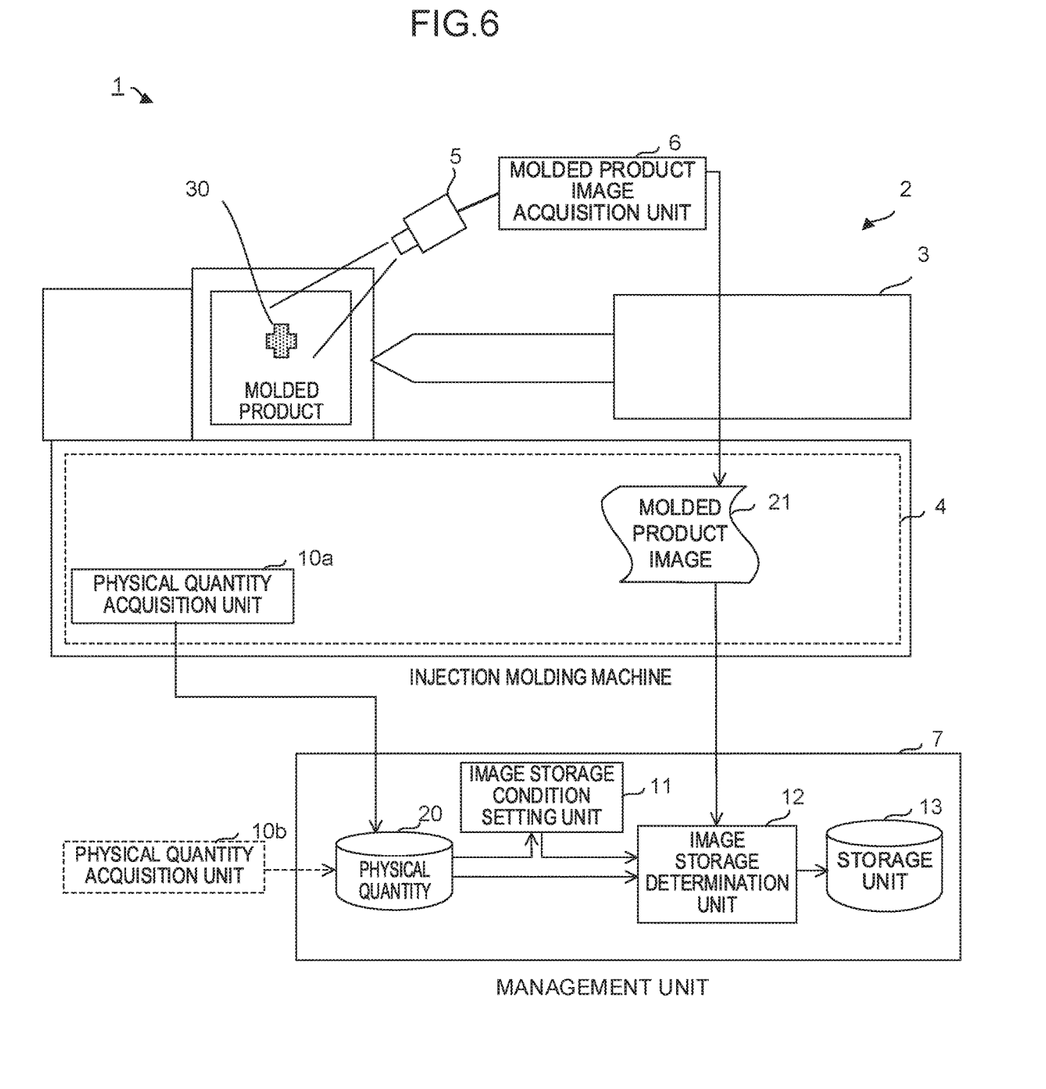
FIG. 6 is a block diagram showing a principal part of an injection molding system according to a first embodiment of the present invention.

For example, in the case of the embodiment described above, the molding monitoring devices are installed in the injection molding machine 2, but the molding monitoring devices may be provided in a management unit 7 connected to the injection molding machine 2 via a network, as shown in FIG. 6.

Further, in the case of the embodiment described above, the image storage determination unit 12 determines whether to store, in the molded product image storage unit 13, the molded product image data 21 according to the conditions for data storage set in the image storage condition setting unit 11, while correlating the molded product image data 21 determined to be stored with the cycle number indicating the sequence of molding cycles. Alternatively, the image storage determination unit 12 may provisionally store all pieces of molded product image data 21 of molded products in the molded product image storage unit 13 while correlating each piece of data with the cycle number indicating the sequence of molding cycles, and then selectively delete an image of molded product determined to be unnecessary depending on the conditions set in the image storage condition setting unit 11 in a predetermined timing (for example, at each timing when images of the predetermined number of molded products are stored in the molded product image storage unit 13, or at a point where available memory of the storage region prepared for the molded product image storage unit 13 reaches a predetermined level or lower).

Figure 7:
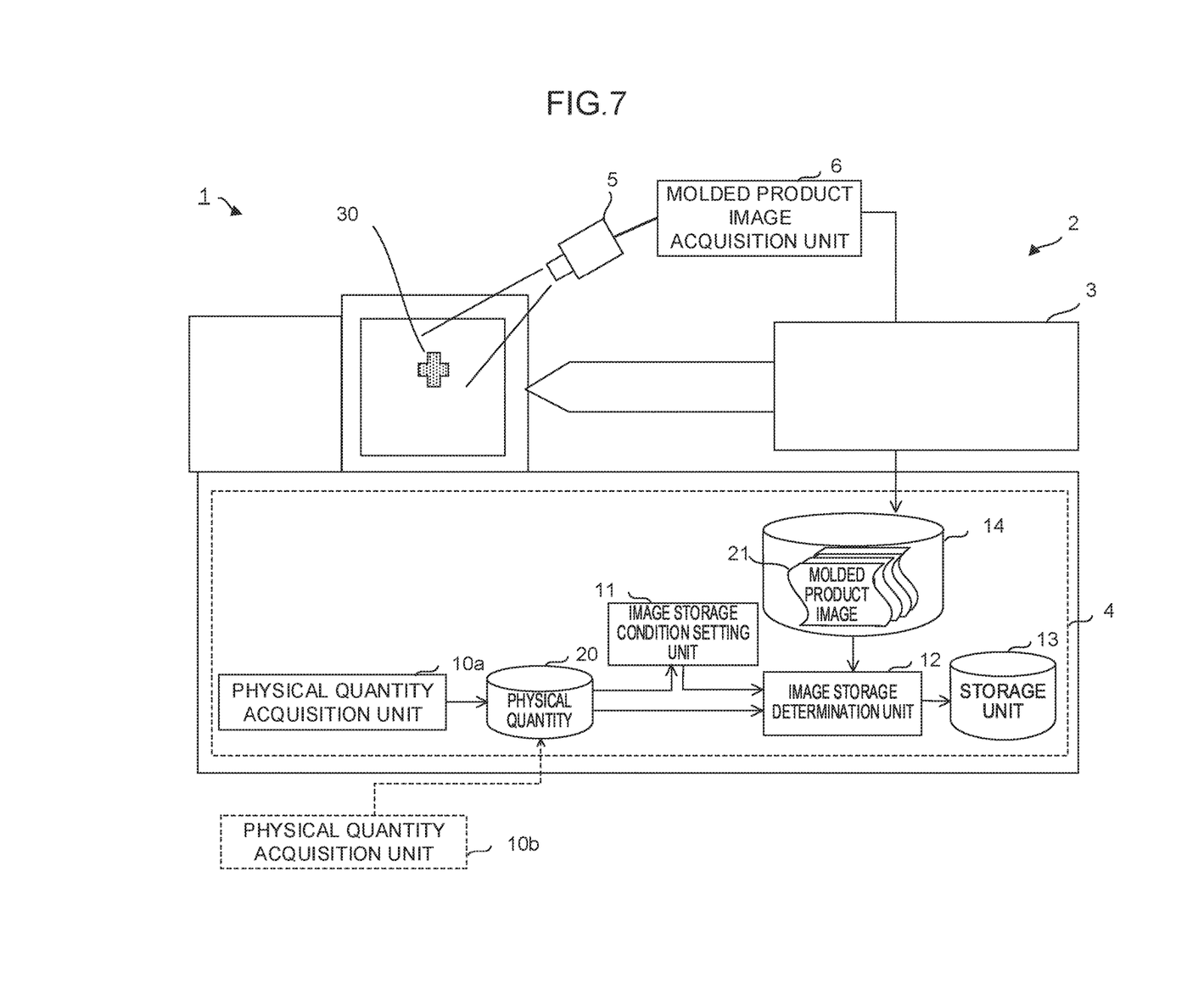
FIG. 7 is a block diagram showing a principal part of an injection molding system according to a second embodiment of the present invention.

Further, as shown in FIG. 7, the injection molding system 1 may include a buffer 14 in the memory of the controller 4 or in a storage medium including the molded product image storage unit 13, so as to save, to the buffer 14, plural pieces of molded product image data 21 obtained from the molded product image acquisition unit 6.

According to this embodiment, the image storage determination unit 12 copies images determined to be necessary according to the conditions set in the image storage condition setting unit 11 to the molded product image storage unit 13 from the buffer 14, and deletes the copied images and images determined to be unnecessary from the buffer 14. This embodiment is particularly effective in the case of setting the number of images stored, as described with reference to FIG. 4 and FIG. 5, in which images stored in several preceding and following molding cycles are stored while correlated with the physical quantities.

In the case of the embodiments described above, the reference physical quantity used in the image storage condition setting unit 11 is calculated according to multiple pieces of physical quantity data 20 obtained in the past molding cycles. Alternatively, an operator may preliminarily set an appropriate value as a reference physical quantity, and the image storage condition setting unit 11 may use the reference physical quantity when setting the conditions. When this case is applied, the set reference physical quantity may be adjusted depending on physical quantities obtained during a corresponding molding cycle.

The invention claimed is:

1. An injection molding system, comprising:
an injection molding machine configured to implement injection molding;
a camera configured to obtain an image of a molded product molded by the injection molding in a current molding cycle;
a memory; and
a controller configured to
obtain at least one past value of a physical quantity of at least one past molded product molded by the injection molding in at least one past molding cycle,
based on the at least one past value of the physical quantity, set a reference value for determining whether to store the image of the molded product,
obtain a value of the physical quantity of the molded product in the current molding cycle,
make a determination whether to store the image of the molded product according to (i) the value of the physical quantity of the molded product and (ii) the set reference value, wherein the determination to store the image of the molded product is made in response to a difference between the value of the physical quantity of the molded product and the reference value exceeding a predetermined threshold, and
store the image of the molded product in the memory in response to the determination to store the image, wherein
the controller is further configured to
set a number of additional images of additional molded products to be additionally stored, wherein the additional molded products are obtained in molding cycles before and after the current molding cycle in which the molded product is molded, and
based on the set number of the additional images to be additionally stored, store, in the memory, the additional images of the additional molded products in addition to the image of the molded product determined to be stored.

2. An injection molding system, comprising:
an injection molding machine configured to implement injection molding;
a camera configured to obtain images of a plurality of molded products molded by the injection molding;
a memory; and
a controller configured to
store, in the memory, the images of the plurality of molded products,
obtain at least one past value of a physical quantity of at least one past molded product molded by the injection molding in at least one past molding cycle,
based on the at least one past value of the physical quantity, set a reference value for determining whether to keep the stored images of the plurality of molded products in the memory,
obtain a value of the physical quantity of a molded product among the plurality of molded products,
make a determination whether to keep the stored image of the molded product in the memory according to (i) the value of the physical quantity of the molded product and (ii) the set reference value, wherein the determination to keep the stored image of the molded product is made in response to a difference between the value of the physical quantity of the molded product and the reference value exceeding a predetermined threshold,
keep the stored image of the molded product in the memory, in response to the determination to keep the stored image, and
delete the stored image of the molded product from the memory, in response to a determination not to keep the stored image, wherein
the controller is further configured to
set a number of additional stored images of additional molded products to be additionally kept in the memory, wherein the additional molded products are obtained in molding cycles before and after a molding cycle in which the molded product is molded, and
based on the set number of the additional stored images to be additionally kept in the memory, keep, in the memory, the additional stored images of the additional molded products in addition to the stored image of the molded product determined to be kept.

3. An injection molding system, comprising:
an injection molding machine configured to implement injection molding;
a camera configured to obtain images of a plurality of molded products molded by the injection molding;
a buffer;
a memory; and
a controller configured to
save, in the buffer, the images of the plurality of molded products,
obtain at least one past value of a physical quantity of at least one past molded product molded by the injection molding in at least one past molding cycle,
based on the at least one past value of the physical quantity, set a reference value for determining whether to store, in the memory, the saved images of the plurality of molded products,
obtain a value of the physical quantity of a molded product among the plurality of molded products,
make a determination, according to (i) the value of the physical quantity of the molded product and (ii) the set reference value, whether to store, in the memory, the saved image of the molded product, wherein the determination to store, in the memory, the saved image of the molded product is made in response to a difference between the value of the physical quantity of the molded product and the reference value exceeding a predetermined threshold,
in response to the determination to store the saved image,
store the saved image of the molded product in the memory, and
delete, from the buffer, the saved image of the molded product that has been stored in the memory, and
in response to a determination not to store the saved image,
delete, from the buffer, the saved image of the molded product determined not to be stored in the memory, wherein
the controller is further configured to
set a number of additional saved images of additional molded products to be additionally stored in the memory, wherein the additional molded products are obtained in molding cycles before and after a molding cycle in which the molded product is molded, and
based on the set number of the additional saved images to be additionally stored, store, in the memory, the additional saved images of the additional molded products in addition to the saved image of the molded product determined to be stored.

4. The injection molding system according to claim 1, wherein
the controller is configured to
obtain multiple past values of the physical quantity of multiple past molded products molded by the injection molding in multiple past molding cycles, and
set the reference value based on a deviation value obtained by calculating statistical values on the multiple past values of the physical quantity of the multiple past molded products obtained in the multiple past molding cycles.

5. The injection molding system according to claim 1, wherein the memory is provided in an operating device connected to the injection molding machine via a network.

* * * * *